US007952740B2

(12) United States Patent
Ikeno et al.

(10) Patent No.: US 7,952,740 B2
(45) Date of Patent: May 31, 2011

(54) COMMUNICATION DEVICE

(75) Inventors: Takahiro Ikeno, Seto (JP); Takashi Ohama, Iwakura (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1113 days.

(21) Appl. No.: 11/717,532

(22) Filed: Mar. 13, 2007

(65) Prior Publication Data
US 2007/0225837 A1 Sep. 27, 2007

(30) Foreign Application Priority Data

Mar. 24, 2006 (JP) ................. 2006-084255

(51) Int. Cl.
*G06F 15/00* (2006.01)
*G06F 15/16* (2006.01)
(52) U.S. Cl. ..................... 358/1.15; 709/206
(58) Field of Classification Search .......... 358/1.15, 358/1.13, 1.14, 1.16, 1.18, 402, 405, 408, 358/407, 406, 468, 400, 440, 438, 434; 709/206, 709/207, 217; 379/100.08; 463/17, 16, 26; 705/8, 317, 309
See application file for complete search history.

(56) References Cited

U.S. PATENT DOCUMENTS

| 5,600,827 | A | 2/1997 | Nakabayashi et al. |
| 7,031,033 | B2 | 4/2006 | Asahi |
| 2004/0145660 | A1 | 7/2004 | Kusaka |
| 2006/0050309 | A1 | 3/2006 | Someya |
| 2007/0083623 | A1 * | 4/2007 | Nishimura et al. ........... 709/223 |

FOREIGN PATENT DOCUMENTS

| JP | H4-220870 | 8/1992 |
| JP | 6-253017 | 9/1994 |
| JP | 6-332950 | 12/1994 |
| JP | H7-307859 | 11/1995 |
| JP | H9-8980 | 1/1997 |
| JP | 2000-312264 | 11/2000 |
| JP | 2002-152447 | 4/2002 |
| JP | 2002-369052 | 12/2002 |
| JP | 2003-167826 | 6/2003 |
| JP | 2004-330430 | 11/2004 |
| JP | 2005-129005 | 5/2005 |
| JP | 2005-135401 | 5/2005 |
| JP | 2005-156196 | 5/2005 |
| JP | 2005-237233 | 8/2005 |
| JP | 2005-237566 | 8/2005 |
| JP | 2005-306715 | 10/2005 |
| JP | 2006-109401 | 4/2006 |
| JP | 2007-53583 | 3/2007 |
| JP | 2007-53615 | 3/2007 |
| JP | 2007-116495 | 5/2007 |
| WO | WO 2005/043398 A1 | 5/2005 |

* cited by examiner

*Primary Examiner* — Saeid Ebrahimi Dehkordy
(74) *Attorney, Agent, or Firm* — Scully, Scott, Murphy & Presser, P.C.

(57) ABSTRACT

A communication device includes: a display unit; a storage unit; and an image display control unit. The display unit is capable of displaying two or more pieces of image data at the same time. The storage unit keeps sent historical information containing sent image data and received historical information containing received image data as sent-and-received historical information. The image display control unit controls the display unit to display the sent image data contained in the sent historical information and the received image data contained in the received historical information on the display unit at the same time.

10 Claims, 11 Drawing Sheets

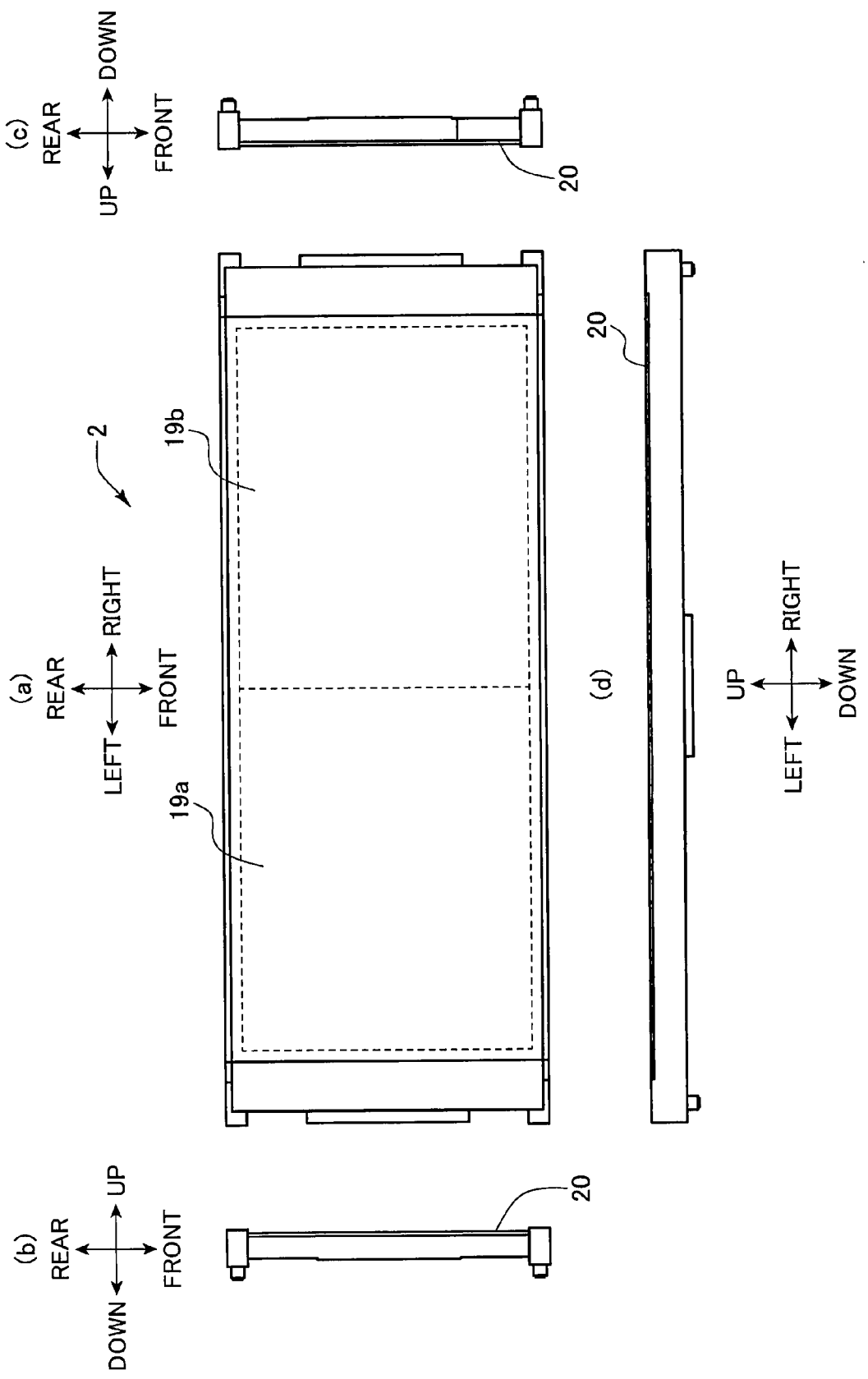

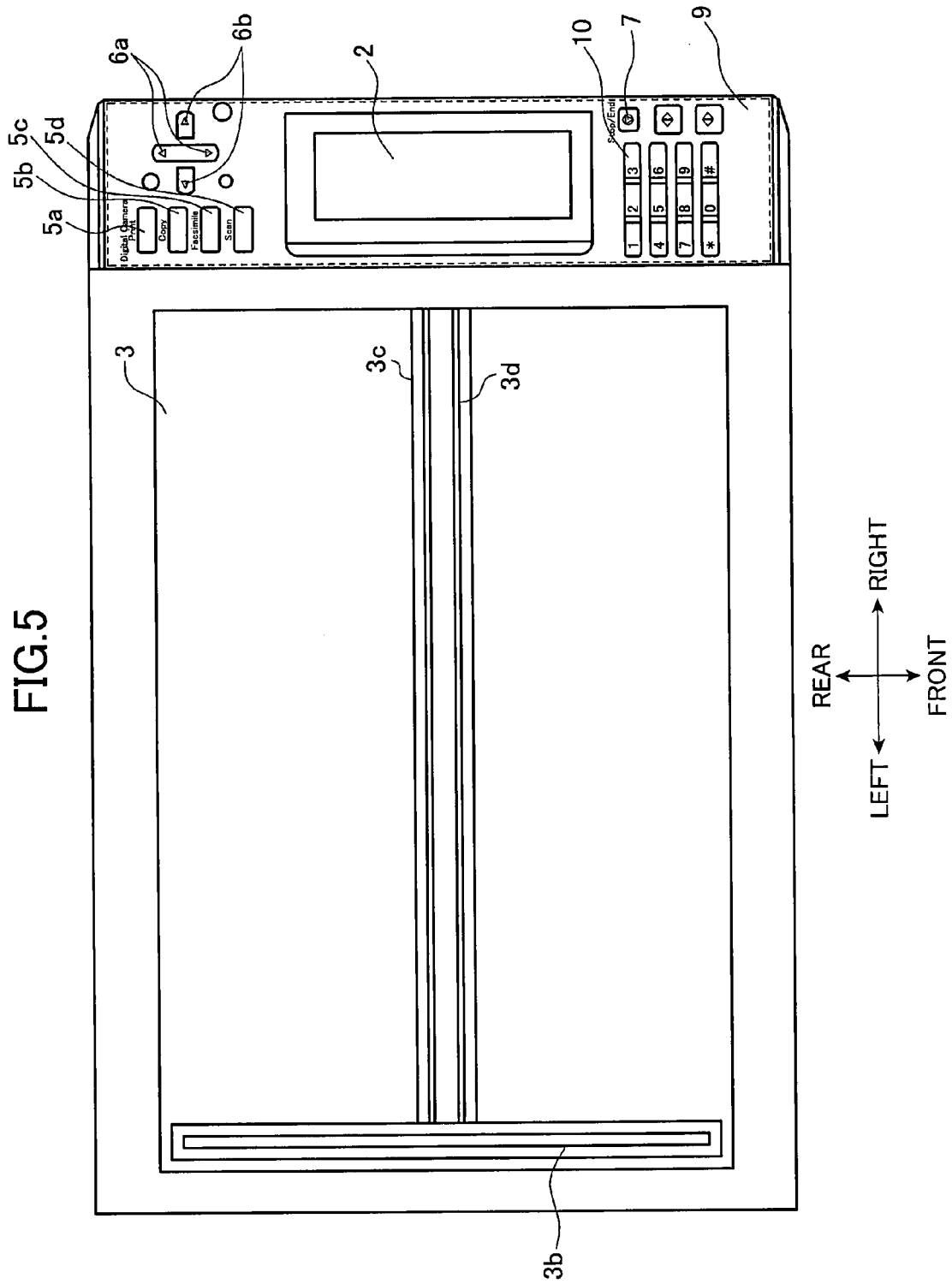

FIG.7

| TARGET TELEPHONE NUMBER | REGISTERED NAME | SENT IMAGE DATA/ RECEIVED IMAGE DATA | SEND-RECEIVE IDENTIFICATION INFORMATION | SEND-RECEIVE DATE/TIME | GROUP NUMBER (GROUP NAME) |
|---|---|---|---|---|---|
| | | | | | |
| | | | | | |
| | | | | | |
| | | | | | |
| | | | | | |
| | | | | | |
| | | | | | |
| | | | | | |

TIME-SERIES DISPLAY MODE

GROUP SELECTION DISPLAY MODE

IMAGE CHECK DISPLAY MODE

FIG.13

TARGET NUMBER SELECTION DISPLAY MODE

| Telephone | Name | Number of Receptions | Number of Sendings |
|---|---|---|---|
| xxx-xxxx-xxx1 | ○○○○ | 0 | 1 |
| xxx-xxxx-xxx2 | ○○○○ | 2 | 0 |
| xxx-xxxx-xxx3 | ○○○○ | 1 | 0 |
| xxx-xxxx-xxx4 | ○○○○ | 10 | 0 |
| xxx-xxxx-xxx5 | ○○○○ | 5 | 0 |

FIG.14

COMMUNICATION MATTER DATA SELECTION DISPLAY MODE

| Telephone | Document | Send/Receive | Communication Results |
|---|---|---|---|
| xxx-xxxx-xxx1 | | → ○○ | 2005/11/23 1:00 Sent |
| Name ○○ ○ | | ← ○○ | 2005/11/23 3:00 Received |

COMMUNICATION DEVICE

CROSS REFERENCE TO RELATED APPLICATION

This application claims priority from Japanese Patent Application No. 2006-84255 filed Mar. 24, 2006. The entire content of this priority application is incorporated herein by reference.

TECHNICAL FIELD

The present invention relates to a communication device, in particular, a communication device having a display unit.

BACKGROUND

Japanese Patent Application Publication No. 2005-129005 discloses a system for managing FAX data by managing received data for each person in charge. In this system, document data received from a remote facsimile machine is associated with a FAX number of the remote facsimile machine, and the data associated with the remote facsimile number is stored in a folder for the corresponding person in charge, in a folder for the corresponding group in charge, or in a folder for the corresponding client.

SUMMARY

According to the above-mentioned conventional system, however, only received data is managed. For this reason, the user cannot recognize how data is exchanged, that is, how data is sent and received.

In view of the foregoing, it is an object of the invention to provide a communication device that enables a user to easily recognize how data is sent and received.

In order to attain the above and other objects, the invention provides a communication device, including: a display unit; a storage unit; and an image display control unit. The display unit is capable of displaying two or more pieces of image data at the same time. The storage unit keeps sent historical information containing sent image data and received historical information containing received image data as sent-and-received historical information. The image display control unit controls the display unit to display the sent image data contained in the sent historical information and the received image data contained in the received historical information on the display unit at the same time.

BRIEF DESCRIPTION OF THE DRAWINGS

In the drawings:

FIG. 4 is an enlarged view of a display unit, showing a plan view (a), a left side view (b), a right side view (c), and a front view (d);

FIG. 5 is a view showing an example of a communication device in which a display unit is disposed lateral to a scanner unit;

FIG. 7 is a view showing contents of a telephone directory;

FIG. 13 is a view showing an example of a screen display in a target number selection display mode; and FIG. 14 is a view showing an example of a screen display in a communication matter data selection display mode.

DETAILED DESCRIPTION

Figure 1:
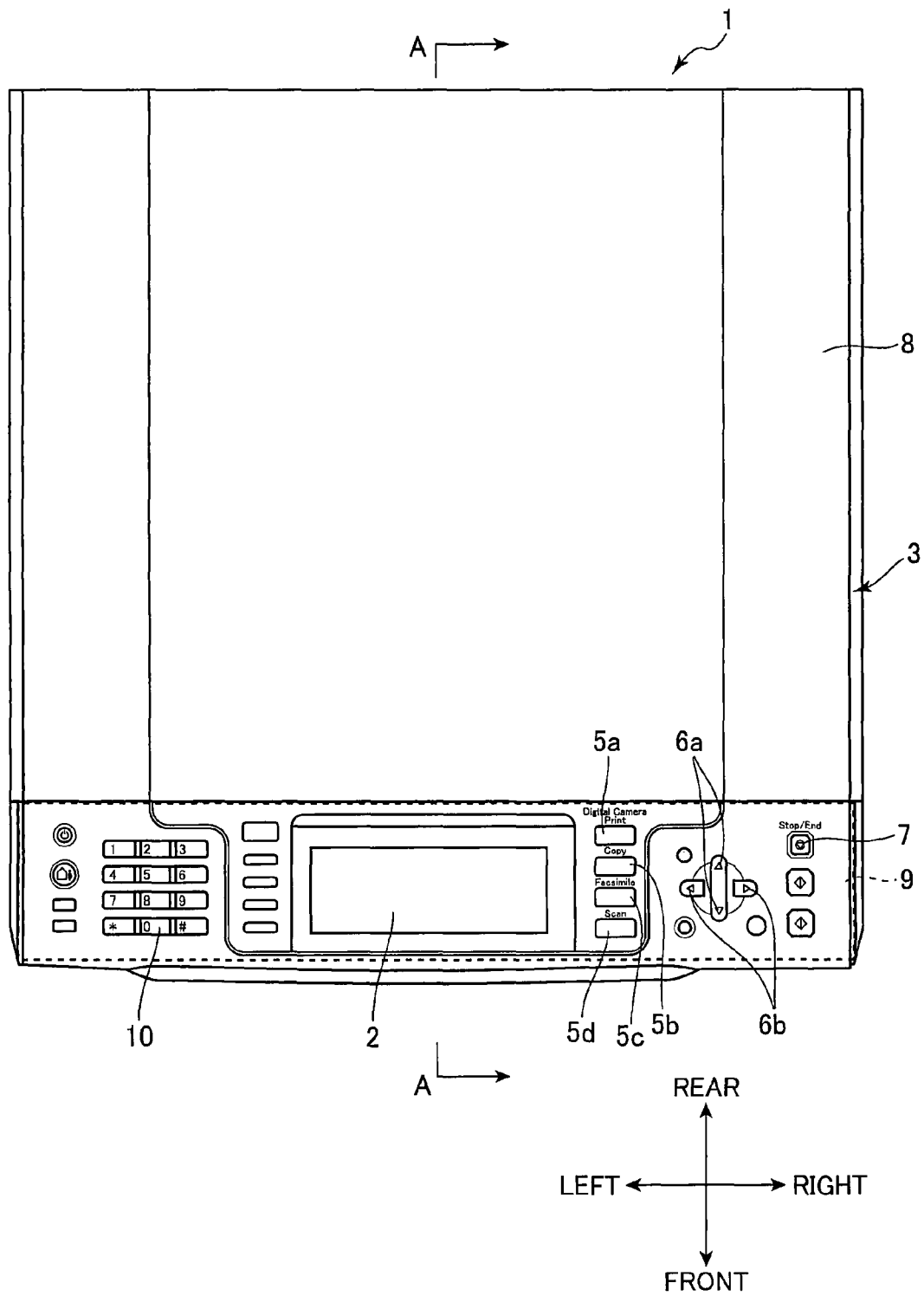
FIG. 1 is a plan view of a communication device in accordance with an embodiment of the present invention.

A communication device according to an embodiment of the invention will be described while referring to the accompanying drawings wherein like parts and components are designated by the same reference numerals to avoid duplicating description.

Figure 2:
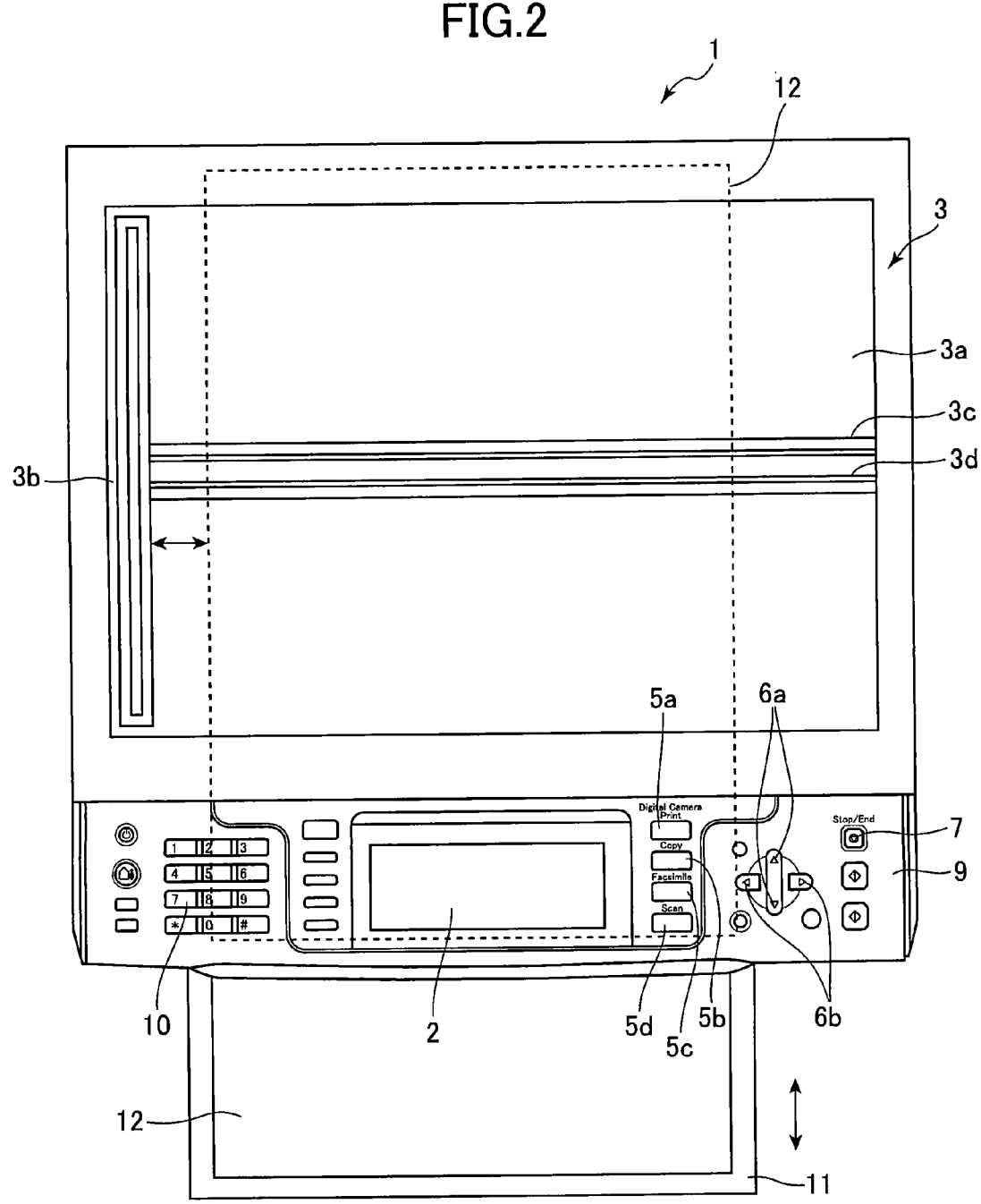
FIG. 2 is a plan view of the communication device in the state where a document pressing panel 8 is opened.
Figure 3A:
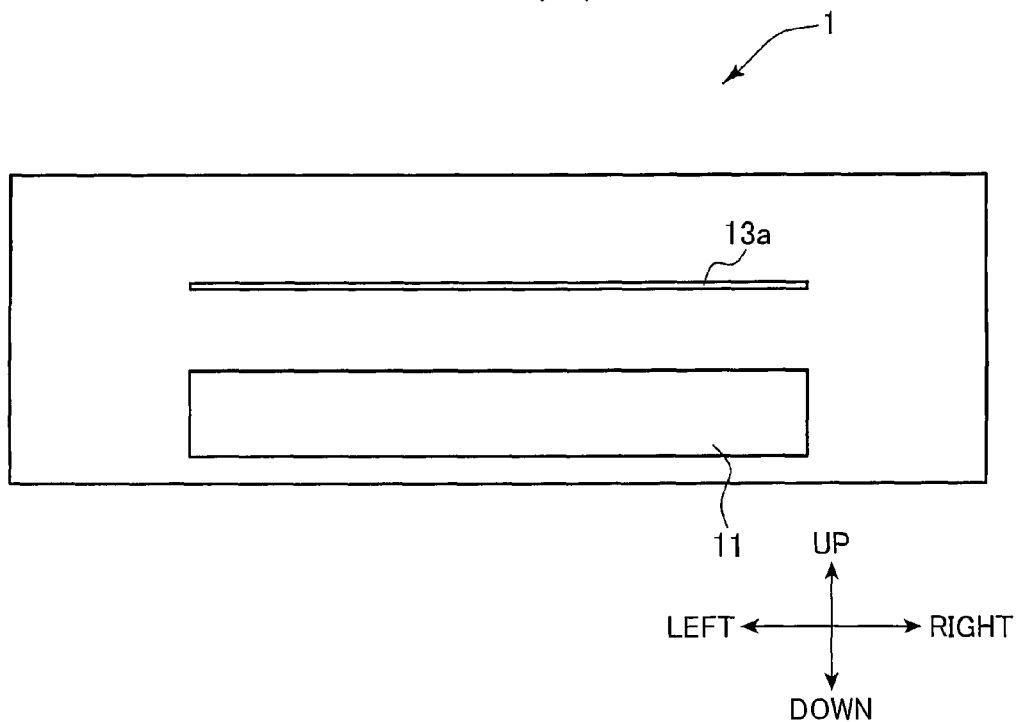
FIG. 3(A) is a front view of the communication device.
Figure 3B:
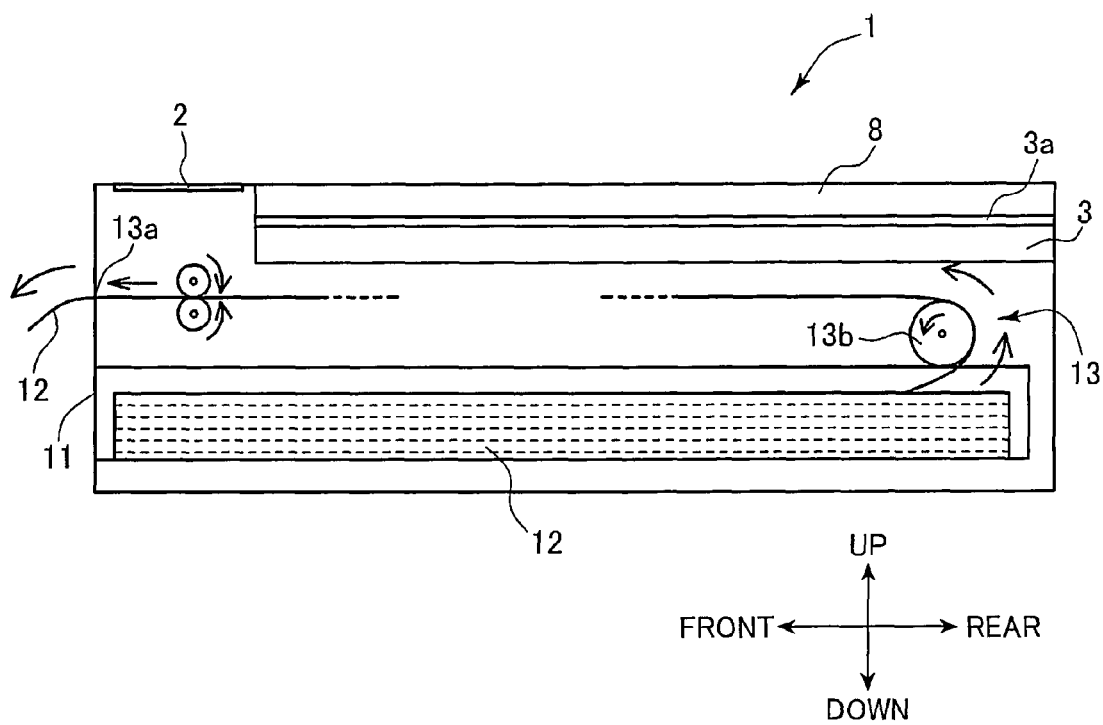
FIG. 3(B) is a schematic sectional view of the communication device.

FIG. 1 is a plan view of a communication device 1 in accordance with an embodiment of the present invention. FIG. 2 is a plan view of the communication device 1 in the state where a document pressing panel 8 is opened. FIG. 3(A) is a front view of the communication device 1. FIG. 3(B) is a schematic sectional view taken along a line A-A in FIG. 1.

The communication device 1 is a multifunction device having a facsimile function.

The terms "upward", "downward", "upper", "lower", "above", "below", "beneath", "right", "left", "front", "rear" and the like will be used throughout the description assuming that the communication device 1 is disposed in an orientation in which it is intended to be used. In use, the communication device 1 is disposed as shown in FIG. 1.

The communication device 1 is substantially square when viewed in a plan view. An operation panel 9 is provided on a front side of an upper surface of the communication device 1. A scanner unit (image read unit) 3 and the document pressing panel 8 are provided on the upper surface of the communication device 1.

The operation panel 9 includes: a display unit 2; and an operation key group 4 (refer to FIG. 6) including a portable media operation key 5a, a copy operation key 5b, a facsimile operation key 5c, a scan operation key 5d, an up and down key 6a, a left and right key 6b, a stop/end key 7 and numeric keys 10.

Figure 12:
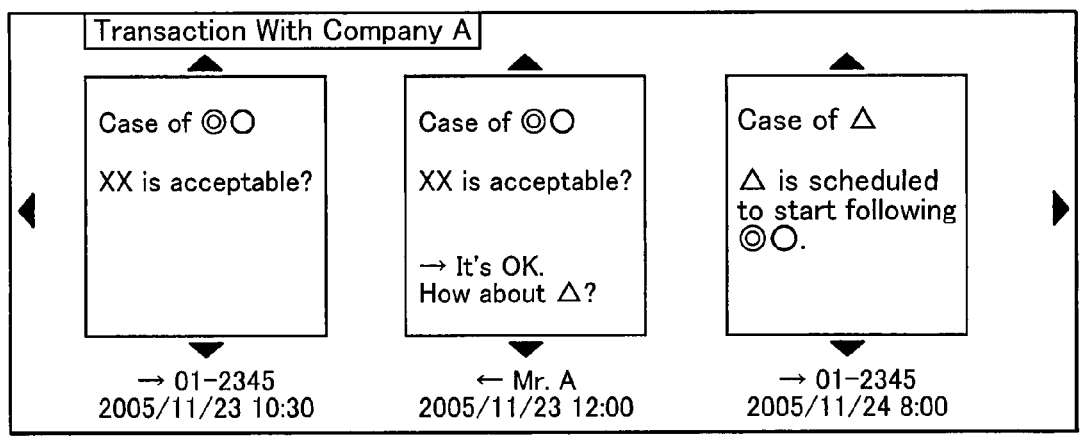
FIG. 12 is a view showing an example of a screen display in an image check display mode.

The display unit 2 is located around the center of the operation panel 9 in the width direction of the communication device 1. The display unit 2 displays image data of a document read by the scanner unit 3 and information to be used for performing copying, facsimile, printing, and scanning functions. The front-to-rear length of the display unit 2 is set to have the substantially same length as a length obtained by subtracting the front-to-rear length of a read surface protection member 3a (FIG. 2) of the scanner unit 3 from the entire front-to-rear length of the main body of the communication device 1. Thus, the display unit 2 has a relatively large size, and can display each image in a relatively large size. The display unit 2 is of a rectangle shape with a relatively large size in the widthwise direction of the communication device 1, and can display a plurality of (at least three) long images that are relatively long in the front-to-rear direction of the communication device 1 so that the long images will be arranged in the widthwise direction of the communication device 1 as shown in FIG. 12, for example.

For example, as shown in FIG. 4, the display unit 2 is formed by arranging two unit panels 19a and 19b in the widthwise direction and by integrally coupling the two unit panels 19a and 19b to each other. Each unit panel 19a, 19b is an LCD (Liquid Crystal Display). Each unit panel 19a, 19b has an aspect ratio of 3 (front-to-rear):4 (widthwise) or 9 (front-to-rear):16 (widthwise). A single protection material 20 is provided over the upper surfaces of the two unit panels 19a and 19b. With this configuration, no boundary appears between the unit panels 19a and 19b, resulting in the readily visible display unit 2.

In the present embodiment, the communication device 1 has the display unit 2 that is long in the widthwise direction. However, the communication device 1 may be modified to have the display unit 2 that is long in the front-to-rear direction as shown in FIG. 5. The configuration of the display unit 2 in FIG. 5 is the same as the configuration of the display unit 2 described above with reference to FIG. 4.

The scanner unit 3 is of a well known type which can read a document of A4 size, for example. The scanner unit 3 is a rectangle when viewed in a plan view and is oriented with its long side extending in the widthwise direction as shown in FIG. 2.

As shown in FIG. 2, the scanner unit 3 includes: the read surface protection member 3a made of glass or the like, an image sensor 3b such as a contact image sensor, a shaft 3c and a driving belt 3d. By driving the driving belt 3d by use of a motor (not shown), the image sensor 3b moves in a direction indicated by an arrow in the figure to read image data of a document placed on the read surface protection member 3a. The thus read image data can be displayed as a color image on the display unit 2. Alternatively, the image data can be printed on a sheet 12 by operating the operation key group 4.

The sheet 12 is, for example, of A4 size. The sheets 12 are stored in a sheet tray 11 in a stacked manner. As shown in FIG. 2, the sheet tray 11 can be put in and taken out the communication device 1 from the front surface side. The sheets 12 are stored in the sheet tray 11 with their longer sides extending in the front-to-rear direction, while the scanner unit 3 is oriented with its longer side extending in the widthwise direction. So, the communication device 1 is square as a whole when viewed in a plan view.

As shown in FIG. 3(B), an image record unit 13 is provided below the scanner unit 3. The sheet tray 11 is disposed below the image record unit 13. When a user inputs his/her instruction to print an image by operating the operation key group 4, an uppermost sheet 12 in the sheet tray 11 is drawn and makes a U-turn in the longitudinal direction thereof and a desired image is printed on the sheet 12 by a print drum 13b. A sheet discharge port 13a is formed on the front surface of the communication device 1. The sheet 12 on which the image is printed is discharged from the sheet discharge port 13a toward the front side of the communication device 1. In this way, the sheet 12 is discharged in a direction toward the user who is using the communication device 1. So, the user is easy to receive the sheet 12.

Figure 6:
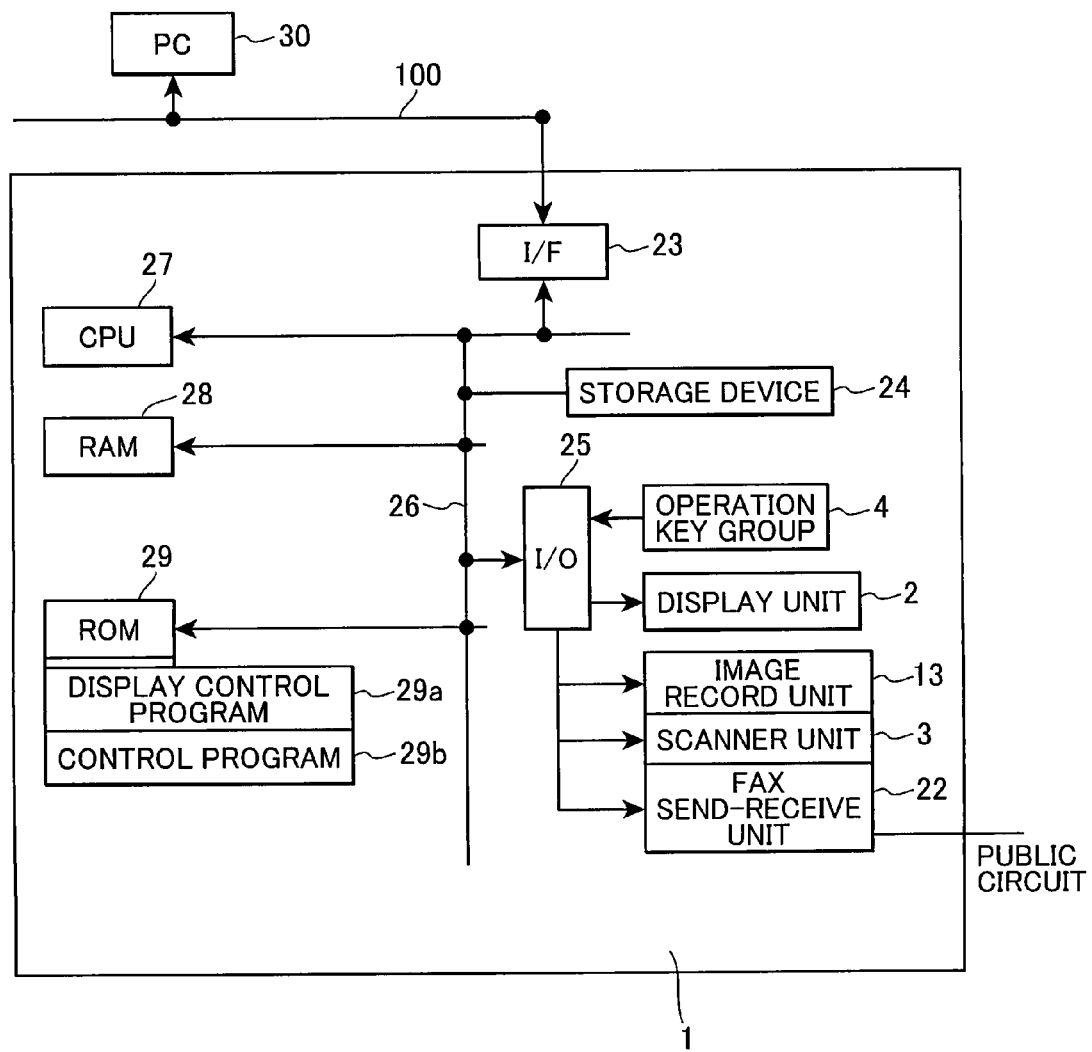
FIG. 6 is a circuit block diagram of the communication device.

FIG. 6 is a circuit block diagram of the communication device 1. The communication device 1 has: a CPU (Central Processing Unit) 27; a RAM (Random Access Memory) 28; a ROM (Read Only Memory) 29 for storing various programs therein; a bus line 26 for connecting these components to one another; an I/O (Input/Output) 25 connected to the bus line 26; a storage device 24 connected to the bus line 26; and a communication interface (I/F) 23 which is connected to a communication network 100 and sends/receives data to/from a personal computer 30. The storage device 24 is configured from a nonvolatile memory, such as an EEPROM (Electrically Erasable Programmable Read Only Memory) and a hard disk. A portable medium such as a flash memory may be also used as the storage device 24. The communication interface 23 may be either a wire communication interface or wireless communication interface. The display unit 2, the scanner unit 3, the operation key group 4, the image record unit 13 and a facsimile send-receive unit 22 are connected to the I/O 25. The facsimile send-receive unit 22 is connected to a public circuit.

The ROM 29 stores programs including a display control program 29a and a control program 29b. The display control program 29a is for displaying a plurality of pages' worth of image data on the display unit 2 so that the plurality of pages' worth of images are arranged next to one another. The control program 29b is a program for activating the image record unit 13, the scanner unit 3 and the facsimile send-receive unit 22 in response to the user's operation of the operation key group 4.

FIG. 7 shows contents of a telephone directory stored in the storage device 24. The telephone directory keeps target telephone numbers and other information to be used in the facsimile function. The telephone directory further keeps sent image data and received image data as historical information. The telephone directory stores a plurality of records each having a target telephone number, a registered name, sent image data/received image data, send/receive identification information, a send/receive date and time, and a group number or group name therein.

Figure 8:
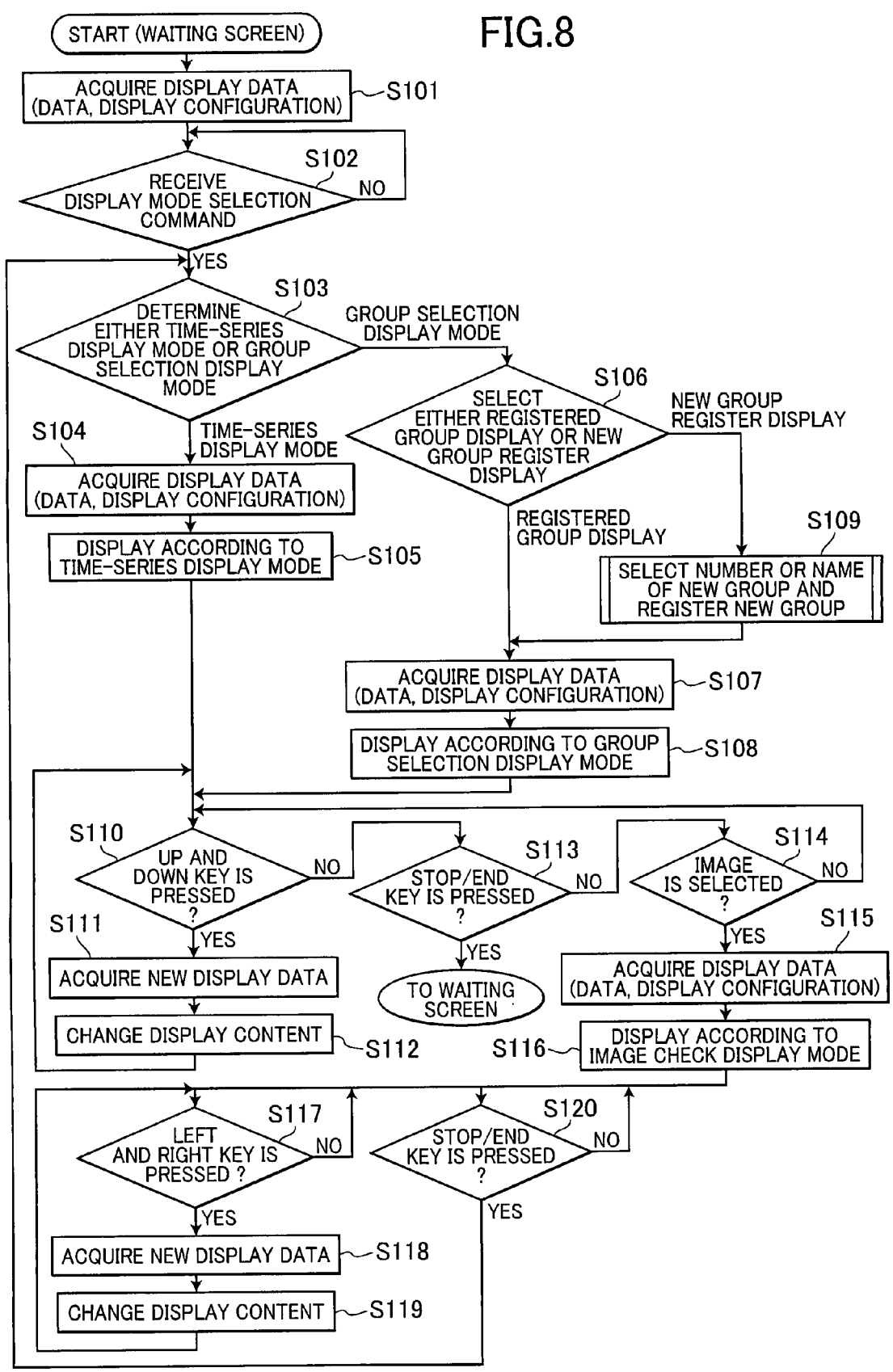
FIG. 8 is a flowchart showing a screen display switch processing performed by a display control program.

FIG. 8 is a flowchart showing a screen display switch processing performed by the display control program 29a.

Figure 9:
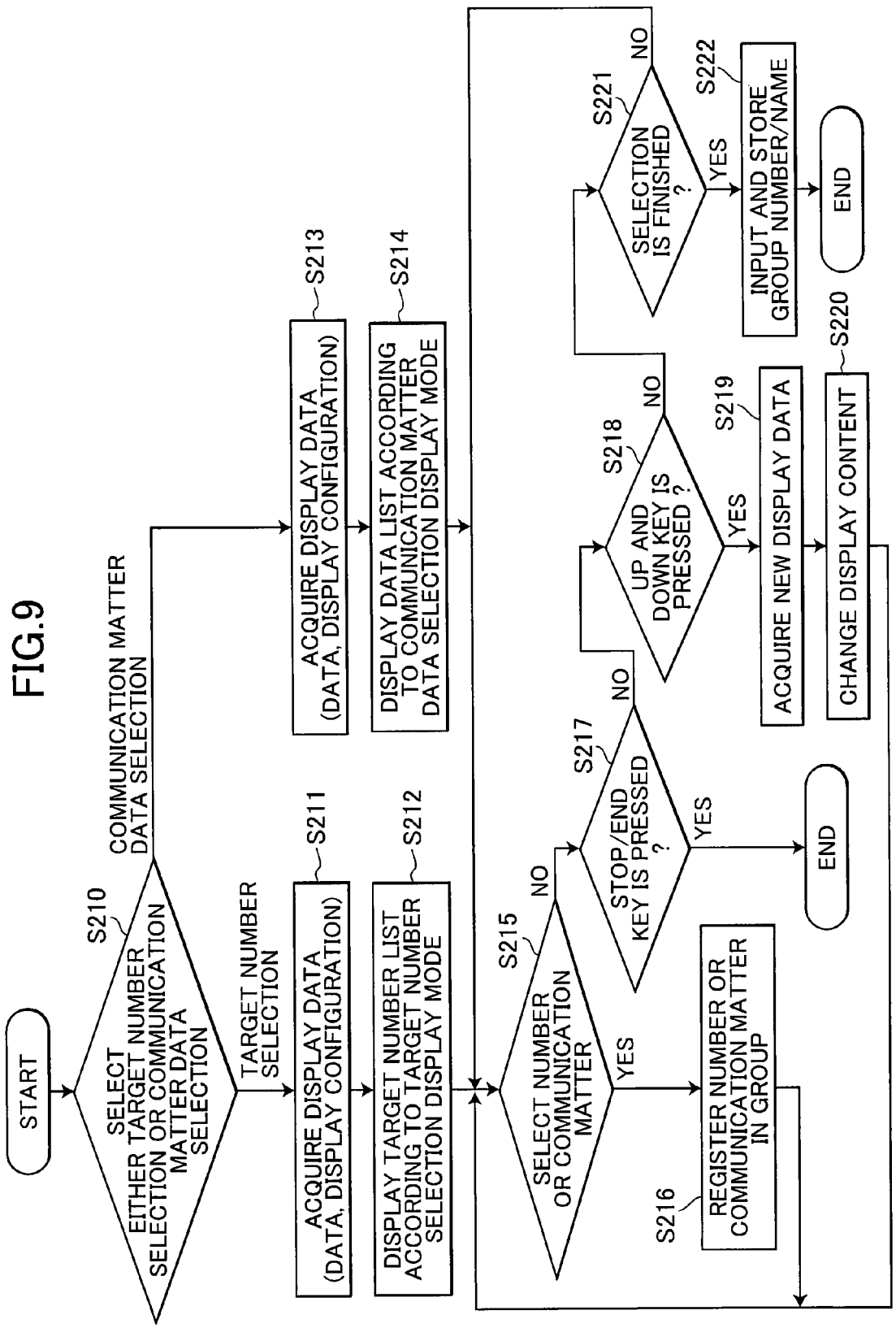
FIG. 9 is a flowchart showing a new group number/name selection and register processing performed by the display control program.

FIG. 9 is a flowchart showing a new group number/name selection and register processing performed by the display control program 29a.

Figure 10:
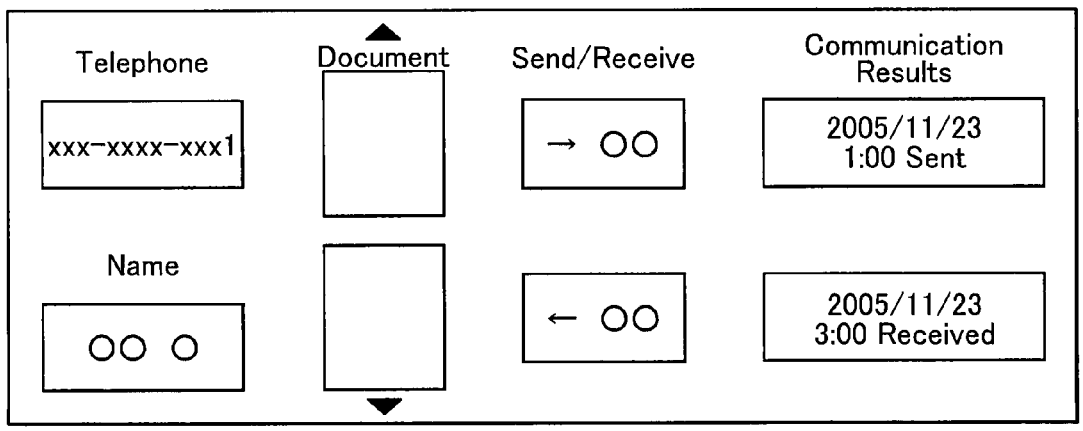
FIG. 10 is a view showing an example of a screen display in a time-series mode.

FIG. 10 is a view showing an example of a screen display in a time-series mode.

In the time-series mode, details of a plurality of communications are displayed in a time-series basis. Details of each communication are indicated by: the telephone number (registered telephone number) or name (registered name) of a target party; a document image (received/sent image); send/receive identification information; and communication results (send/receive date and time and results). In the example of FIG. 10, details of two communications are listed one above the other on the screen. The upper one indicates details of one communication by showing: the target telephone number; a document image sent through this communication; data indicating that the image is sent; and send date/time and results. The lower one indicates details of another communication by showing: the target party name; a document image received through this communication; data indicating that the image is received; and receive date/time and results.

Figure 11:
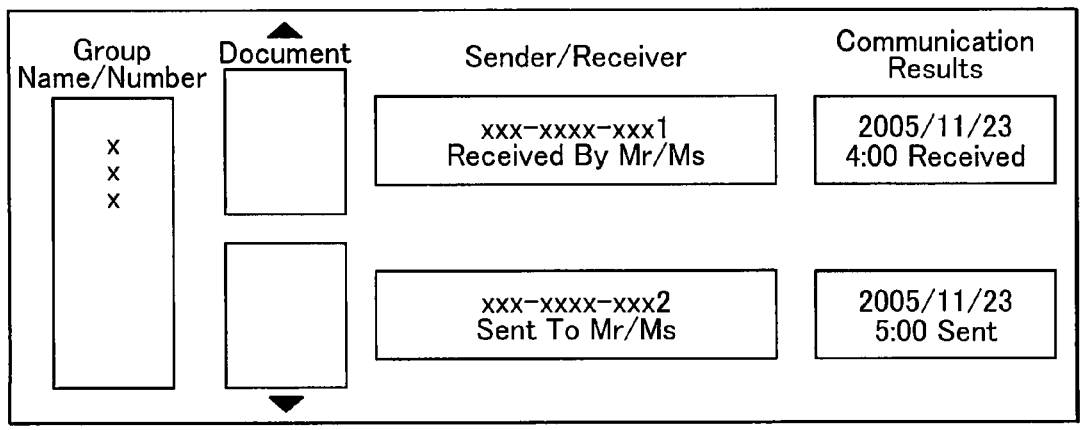
FIG. 11 is a view showing an example of a screen display in a group selection display mode.

FIG. 11 is a view showing an example of the screen display in a group selection display mode. According to the communication device 1, the user can designate one or more facsimile communications into one group, and the communication device 1 can display information on the thus grouped facsimile communications in the group selection display mode.

In the group selection display mode, details of a plurality of communications that belong to one group are displayed. The group is indicated by the group name or group number. Details of each communication are indicated by: a document (received/sent image), a sender/receiver, and communication results (send/receive date and time and results). It is noted that each group can be constituted from: one or more communication that has been executed with the user's selected one or more target party; or from one or more communication that has sent or received the user's selected one or more document image (communication matter).

In the example of FIG. 11, group name or group number for one group (registered group) is shown in the most left column in the screen. Details of two communications that belong to this group are listed one above the other on the screen. The upper one indicates: a document image, data indicating that the document image is received from a target party with a target telephone number and a target name, and receive date/time and results. The lower one indicates: a document image, data indicating that the document image is transmitted to a target party with a target telephone number and a target name, and send date/time and results.

It is noted that when the group name indicates a specific target party, only the text "sent" or "received" may be displayed but other data indicative of the sender or receiver may not be displayed as the sender/receiver information.

Or, when the group name indicates received documents, only the text "received" may be displayed, but the text "sent" may not be displayed as the sender/receiver information. Similarly, when the group name indicates sent documents, only the text "sent" may be displayed, but the text "received" may not be displayed as the sender/receiver information.

FIG. 12 is a view showing an example of the screen display in an image check display mode. In the image check display mode, details of a plurality of received or sent document images, which are contained in the sent image data/received image data stored in the telephone directory (FIG. 7), are displayed side by side. The user can check the contents of the received or sent document images.

FIG. 13 is a view showing an example of the screen display in a target number selection display mode. In the target number selection display mode, a target number list is displayed on the display screen. The target number list lists up: name (registered name), the number of times of reception, and the number of times of sending for each of the plurality of target telephone numbers stored in the telephone directory of FIG. 7.

FIG. 14 is a view showing an example of the screen display in a communication matter data selection display mode. In the communication matter data selection display mode, a communication matter data list is displayed on the display screen. The communication matter data list lists up: details of the plurality of communications stored in the telephone directory of FIG. 7. Details of each communication include: telephone number (registered telephone number) or name (registered name) of a target party; a document image (received or sent image); send/receive identification information; and communication results (send/receive date and time and results).

In the example of FIG. 14, details of two communications (communication matters) are listed one above the other on the screen. The upper one indicates: a target telephone number; a document image; data indicating that the document image is sent; and send date/time and results. The lower one indicates: a target party name; a document image; data indicating that the document image is received; and receive date/time and results.

Next, operations of the communication device 1 will be described with reference to FIG. 8 to FIG. 14.

As shown in FIG. 8, when the user selects a facsimile image display in a waiting screen, the display control program 29a acquires display data (data to be displayed and data of display configuration) in S101 to display a facsimile-image-display mode selection screen prompting the user to select his/her desired mode from among the time-series mode and the group selection display mode. Then, the display control program 29a determines whether or not a display mode selection command is received in S102. When the user operates the operation key group 4 to select his/her desired mode from among the time-series mode and the group selection display mode, the display mode selection command is issued.

When the display mode selection command is received (YES in S102), the display control program 29a determines whether the user has selected the time-series mode or the group selection display mode based on the content of the display mode selection command in S103.

When the time-series mode is selected, the display control program 29a acquires display data (data to be displayed and data of display configuration) for the time-series mode in S104, and displays the display data according to the time-series mode in S105 as shown in FIG. 10. Then, the program proceeds to S110. It is noted that in S104, the display control program 29a acquires the data to be displayed from the telephone directory.

On the other hand, when the user does not select the time-series mode, but selects the group selection display mode, the display control program 29a determines whether the user has operated the operation key group 4 to select a registered group display or a new group register display in S106.

When the user has selected the registered group display in order to designate his/her desired registered group, the display control program 29a acquires display data (data to be displayed and data of display configuration) for the registered group display in S107, and displays the display data according to the group selection display mode in S108 as shown in FIG. 11. Then, the program proceeds to S110. It is noted that in S107, the display control program 29a acquires the data to be displayed for his/her desired group from the telephone directory.

On the other hand, when the user has selected the new group register display, the display control program 29a selects the group number or group name for a new group to be registered, and registers the selected group number or group name for the new group in S109. Details of the processing of S109 will be described later. Then, the program proceeds to S107, wherein the display control program 29a acquires display data (data to be displayed and data of display configuration) for the newly-registered group, and displays the display data according to the group selection display mode in S108 as shown in FIG. 11. Then, the program proceeds to S110.

In S110, the display control program 29a determines whether or not the up and down key 6a is pressed. When the up and down key 6a is pressed (YES in S110), the display control program 29a acquires display data indicative of other communications from the telephone directory in S111, and changes the content displayed on the display unit 2 in S112.

More specifically, in the time-series mode (FIG. 10), when the up and down key 6a is pressed to indicate "UP" or "DOWN", the display control program 29a acquires display data for a communication that has been executed prior to or subsequent to the presently-being displayed communications, and changes the contents displayed on the display unit 2.

Similarly, in the group selection mode (FIG. 11), when the up and down key 6a is pressed to indicate "UP" or "DOWN", the display control program 29a acquires display data for a communication that is other than the presently-being displayed communications but that belongs to the presently-being selected group, and changes the contents displayed on the display unit 2.

On the other hand, when the up and down key 6*a* is not pressed (NO in S110), the display control program 29*a* determines whether or not the stop/end key 7 is pressed in S113. When the stop/end key 7 is pressed (YES in S113), the operation proceeds to the waiting screen.

On the other hand, when the stop/end key 7 is not pressed (NO in S113), the display control program 29*a* determines whether or not the user selects any document image in S114. When the user selects some document image (YES in S114), the display control program 29*a* acquires display data (data to be displayed and data of display configuration) for the selected document image in S115, and changes the displayed content from the display mode of FIG. 10 or FIG. 11 to the image check display mode in S116 to show details of the user's selected document image as shown in FIG. 12. It is noted that in S115, the display control program 29*a* acquires the data to be displayed from the telephone directory.

Next, in S117, the display control program 29*a* determines whether or not the left and right key 6*b* is pressed. When the left and right key 6*b* is pressed (YES in S117), the display control program 29*a* acquires display data for another document image that is stored in the telephone directory in S118, and changes the displayed content in S119.

More specifically, if the display control program 29*a* has entered the image check display mode from the time-series mode in S116, when the left and right key 6*b* is pressed to indicate "LEFT" or "RIGHT" in the image check display mode, the display control program 29*a* acquires display data for a document image that has been sent or received prior to or subsequent to the presently-being displayed document images, and changes the displayed content in S119.

On the other hand, if the display control program 29*a* has entered the image check display mode from the group selection mode in S116, when the left and right key 6*b* is pressed to indicate "LEFT" or "RIGHT" in the image check display mode, the display control program 29*a* acquires display data for a document image that is sent or received through a communication that is other than the presently-being displayed communications but that belongs to the presently-being selected group, and changes the displayed content in S119.

When the left and right key 6*b* is not pressed (NO in S117), the display control program 29*a* determines whether or not the stop/end key 7 is pressed in S120. When the stop/end key 7 is pressed (YES in S120), the operation returns to S103.

In the new group number/name selection and register processing of S109, as shown in FIG. 9, the display control program 29*a* determines in S210 whether the user has operated the operation key group 4 to select a target number selection to select target parties desired to be collected up into a new group or a communication matter data selection to select communication matters desired to be collected up into a new group.

When the user selects the target number selection, the display control program 29*a* acquires display data (data to be displayed and data of display configuration) for the target number selection in S211, and displays the target number list according to the target number selection display mode in S212 as shown in FIG. 13. It is noted that in S211, the display control program 29*a* acquires the data to be displayed from the telephone directory. Then, the program proceeds to S215.

As shown in FIG. 13, the target number list shows telephone numbers and names of the plurality of target parties registered in the telephone directory. The target number list further shows the number of receptions from each target party and the number of sendings to each target party. The user can select one or more target telephone number desired to be allocated into the new group while pressing the up and down key 6*a*.

On the other hand, when the user selects the communication matter data selection, the display control program 29*a* acquires display data (data to be displayed and data of display configuration) for the communication matter data selection in S213, and displays the communication matter data list according to the communication matter data selection display mode in S214 as shown in FIG. 14. It is noted that in S213, the display control program 29*a* acquires the data to be displayed from the telephone directory. Then, the program proceeds to S215.

As shown in FIG. 14, the communication matter data list shows, for each communication matter, telephone number or name of a target party, a sent or received document image, send/receive identification information, and communication results (send/receive date and time and results). By observing the content of the sent or received document image for each communication matter, the user can know the contents of the communication matter, and can select one or more communication matter desired to be allocated in the new communication matter group. The user can select one or more communication matter, represented by one or more sent/received document image, desired to be allocated into the new group while pressing the up and down key 6*a*.

When the user selects one or more target telephone number desired to be registered for a new group from the target number list of FIG. 13, or one or more communication matter desired to be registered for a new group from the communication matter data list of FIG. 14 (YES in S215), the display control program 29*a* registers the selected one or more target telephone number or the selected one or more communication matter in the new group in S216.

On the other hand, when no target telephone number or no communication matter is selected (NO in S215), the display control program 29*a* determines whether or not the stop/end key 7 is pressed in S217. When the stop/end key 7 is pressed (YES in S217), the operation is finished.

When the stop/end key 7 is not pressed (NO in S217), the display control program 29*a* determines whether or not the up and down key 6*a* is pressed in S218. When the up and down key 6*a* is pressed (YES in S218), the display control program 29*a* acquires display data from the telephone directory in S219, and changes the displayed contents in S220, and the operation returns to S215.

More specifically, when the up and down key 6*a* is pressed to indicate "UP" or "DOWN" while the target number list of FIG. 13 is being displayed, another target number that is located prior to or subsequent to the presently-being displayed target numbers in the telephone directory is displayed together with its corresponding target name, reception number, and sending number.

Similarly, when the up and down key 6*a* is pressed to indicate "UP" or "DOWN" while the communication matter data list of FIG. 14 is being displayed, another communication matter that is located prior to or subsequent to the presently-being displayed communication matters in the telephone directory is displayed.

On the other hand, when the up and down key 6*a* is not pressed (NO in S218), the display control program 29*a* determines whether or not the user desires to finish his/her selection of target number or communication matter for the new group in S221. When selection is not finished (NO in S221), the operation returns to S215.

On the other hand, when the user operates the operation key group 4 to indicate his/her desire to finish his/her selection (YES in S221), the display control program 29a inputs and stores the new group name or group number in S222, and the operation is finished.

As described above, according to the present embodiment, sent historical information including sent image data and received historical information including received image data are kept being stored as sent-and-received historical information, and the sent image data and the received image data is displayed at the same time. So, the user can simultaneously confirm both of the received image data and sent image data. Thus, the user can easily confirm the state of communication with the target party with whom the user is now performing facsimile communication (sending and reception).

Furthermore, since the sent-and-received historical information can be divided into several groups according to the contents of communication matters, the user can easily confirm the state of communication which the user is now performing on some matter.

While the invention has been described in detail with reference to the embodiment thereof, it would be apparent to those skilled in the art that various changes and modifications may be made therein without departing from the spirit of the invention.

For example, in each of the screen displays of FIGS. 10, 11, and 14, both of date and time when the communication was executed are indicated. However, only the time when the communication was executed may be displayed on the display screen if information of date is not so important.

What is claimed is:

1. A communication device, comprising:
   a display unit capable of displaying two or more pieces of image data at the same time;
   a storage unit keeping sent historical information containing sent image data and received historical information containing received image data as sent-and-received historical information;
   an image display control unit controlling the display unit to display the sent image data contained in the sent historical information and the received image data contained in the received historical information on the display unit at the same time, both of the sent image data and received image data that are contained in a plurality of sets of sent-and-received historical information indicative of a plurality of communications executed with a single target group; and
   a target-group setting unit selecting a plurality of target parties and setting the selected target parties in a single target group, the target-group setting unit including a target-group registering unit that selects at least one set of image data from among the sent image data and received image data contained in the sent-and-received historical information and that registers, as a single communication matter group, at least one target party, with which the selected at least one set of image data is communicated.

2. The communication device as stated in claim 1, wherein the image display control unit controls the display unit in a linear display mode to display a content of a single set of sent-and-received historical information indicative of a single communication in a line.

3. The communication device as stated in claim 1, wherein the image display control unit controls the display unit in an image check display mode to display the received image data and sent image data contained in a plurality of sets of sent-and-received historical information side by side.

4. The communication device as stated in claim 3, wherein the image display control unit has a display mode switch unit switching between the linear display mode and the image check display mode.

5. The communication device as stated in claim 1, wherein the display unit is capable of displaying two or more pieces of image data on a single screen, and the image display control unit controls the display unit to display the sent image data contained in the sent historical information and the received image data contained in the received historical information on the display unit on the single screen.

6. A communication device, comprising:
   a display unit capable of displaying two or more pieces of image data at the same time;
   a storage unit keeping sent historical information containing sent image data and received historical information containing received image data as sent-and-received historical information; and
   an image display control unit controlling the display unit to display the sent image data contained in the sent historical information and the received image data contained in the received historical information on the display unit at the same time;
   wherein the storage unit stores a list of a plurality of telephone numbers for a plurality of target parties, at least one target party among the plurality of target parties belonging to era single target group, and
   wherein the image display control unit controls the display unit to display, at the same time, both of sent image data and received image data that are contained in a plurality of sets of sent-and-received historical information indicative of a plurality of communications executed with the single target group.

7. A communication device, comprising:
   a display unit capable of displaying two or more pieces of image data at the same time;
   a storage unit keeping sent historical information containing sent image data and received historical information containing received image data as sent-and-received historical information; and
   an image display control unit controlling the display unit to display the sent image data contained in the sent historical information and the received image data contained in the received historical information on the display unit at the same time,
   wherein the image display control unit controls the display unit in a linear display mode to display a content of a single set of sent-and-received historical information indicative of a single communication in a line, and
   the content of the sent-and-received historical information for each communication contains communicated image data, a telephone number of a target party with whom the communication is executed, communication type identification information indicative of whether the communication is sent or received, and a communication time when the communication has been executed.

8. A communication device, comprising:
   a display unit capable of displaying two or more pieces of image data at the same time;
   a storage unit keeping sent historical information containing sent image data and received historical information containing received image data as sent-and-received historical information; and
   an image display control unit controlling the display unit to display the sent image data contained in the sent historical information and the received image data contained in the received historical information on the display unit at the same time, wherein the display unit is capable of displaying two or more pieces of image data on a single screen and the image display control unit controls the display unit to display, on the single screen, both the sent image data and the received image data that are contained in a plurality of sets of sent-and-received historical information indicative of a plurality of communications executed with a single target party.

9. A communication device, comprising:

a display unit capable of displaying two or more pieces of image data at the same time;

a storage unit keeping sent historical information containing sent image data and received historical information containing received image data as sent-and-received historical information; and an image display control unit controlling the display unit to display the sent image data contained in the sent historical information and the received image data contained in the received historical information on the display unit at the same time, wherein the display unit is capable of displaying two or more pieces of image data on a single screen and the image display control unit controls the display unit to display, on the single screen, both the sent image data and the received image data that are contained in a plurality of sets of sent-and-received historical information indicative of a plurality of communications executed with a single target group.

10. The communication device as stated in claim 9, wherein the storage unit stores a list of a plurality of telephone numbers for a plurality of target parties, at least one target party among the plurality of target parties belonging to the single target group.

* * * * *